United States Patent [19]

Cameron

[11] Patent Number: 5,034,620
[45] Date of Patent: Jul. 23, 1991

[54] VEHICLE BATTERY SAFETY SWITCH

[76] Inventor: Robert W. Cameron, 4041 Home Rd., Bellingham, Wash. 98226

[21] Appl. No.: 450,607

[22] Filed: Dec. 13, 1989

[51] Int. Cl.<sup>5</sup> ............................................. H02H 7/18
[52] U.S. Cl. ............................ 307/10.7; 200/61.45 M; 200/61.52; 180/282
[58] Field of Search .......................... 307/10.1, 10.7; 200/61.45 R, 61.45 M, 61.52, 61.53; 337/1, 15, 96; 320/30, 39, 40, 41; 180/282

[56] References Cited

U.S. PATENT DOCUMENTS

| | | | |
|---|---|---|---|
| 2,099,483 | 11/1937 | Hinde | 200/61.47 |
| 2,145,543 | 1/1939 | Gross | 200/61.08 |
| 2,438,094 | 3/1948 | Petrullo | 307/112 |
| 3,410,359 | 11/1968 | Mollison | 180/283 |
| 3,641,290 | 2/1972 | Murphy et al. | 200/61.45 M |
| 3,830,331 | 8/1974 | Piazza | 180/282 |
| 4,149,093 | 4/1979 | D'Alessio et al. | 320/40 X |
| 4,581,504 | 4/1986 | Hamel, Sr. | 200/61.45 R X |
| 4,798,968 | 1/1989 | Deem | 307/10.7 |

Primary Examiner—J. R. Scott
Attorney, Agent, or Firm—Hughes & Multer

[57] ABSTRACT

An emergency circuit breaker for preventing the transmission of electrical current to a vehicle from a battery connected in an electric circuit of the vehicle. The battery is connected in the circuit of the vehicle so that at least one terminal of the battery is not grounded to the structure of the vehicle under normal conditions. The circuit breaker is provided as a separate modular unit which is mountable to the external posts of the battery. The circuit breaker has an impact resistant housing for shielding the ungrounded terminal of the battery from electrical contact with the structure of the vehicle. A fuse link is provided for interrupting the flow of electrical current from the battery to the vehicle circuit in response to an increase in the electrical current flowing through the fuse link. The ungrounded terminal of the battery is electrically connected to a first side of the fuse link, and the impact resistant housing shields the connector from electrical contact with the structure of the vehicle. A switch is provided for electrically connecting the second side of the fuse link to ground in response to perturbation of the vehicle by an accident. Accordingly, in response to perturbation of the vehicle by an accident, the switch electrically connects the second side of the fuse link to ground so as to increase the flow of current through the fuse link, so that the fuse link blows and thus interrupts the circuit.

18 Claims, 2 Drawing Sheets

VEHICLE BATTERY SAFETY SWITCH

BACKGROUND OF THE INVENTION

1. Field of the Invention

The present invention relates to electrical switches in general, and, more particularly, to a safety switch for disconnecting a vehicle battery from the electrical system of the vehicle in the event of an accident.

2. Background Art

Motor vehicle accidents, whether involving an impact, such as to the front, rear, or side of the vehicle, or a rollover of the vehicle, frequently result in the release of flammable fuel. In the event that the vehicle is inverted by the accident, combustible engine oil may also pour out of the crankcase or sump and spill into the engine compartment. Not infrequently, such spilled fuel or oil ignites, with grievous results. Such ignition may be the result of any of a number of causes, however one common cause is the sparking of live wiring in the wrecked vehicle. Such sparking can take place not only in high voltage ignition systems, but may also take place elsewhere in the vehicle's wiring harness, which typically extends throughout the vehicle's body. Even if the engine, and thus its alternator, has ceased to operate, the vehicle's battery may continue to supply current to such circuits. The battery itself may also be tossed about or crushed in the engine compartment by the force of the accident, and its live terminal (typically the positive terminal) may come into contact with the metallic bodywork of the car, creating severe sparking, much like that of an arc welder. Such severe sparking is able to ignite not only flammable fuel, but also grease and spilled oil in the engine compartment. Because the hood is frequently crushed or otherwise unopenable as a result of the accident, it may be impossible to gain access to the engine compartment to suppress such a fire.

A number of devices have been proposed in the past to cut off current in the vehicle's electrical system in the event of an accident. U.S. Pat. No. 2,099,483, issued Nov. 16, 1937 to Hinde, discloses a circuit breaker which is wired into the electrical system between the ignition wiring and the ammeter. Two versions of this device are disclosed, one of which is a mercury switch: in the event that the vehicle overturns, the mercury runs along the inside of a cylindrical casing so as to ground the circuit and blow a fuse. In the second version of the device, the circuit is broken mechanically; when the device is in the vertical position, a conical closing member bridges an insulating annulus at the lower end of a conical bore so as to close the circuit, and when the device is tilted to the horizontal, the circuit closer slides in the bore so as to break the circuit. Both versions, however, fail to provide for circuit breaking action in the event of a vehicular impact other than a rollerover accident. Furthermore, they fail to eliminate the live wiring leading from the vehicle's battery up to the circuit breaker, or the live battery post itself, either of which may cause sparking in the event of an accident.

U.S. Pat. No. 2,145,543, issued Jan. 31, 1939 to Gross, discloses another switch which is wired in the ignition circuit between the battery and the ammeter. The device consists of a mercury-containing well having two terminals therein; so long as the mercury remains in the well, the circuit remains closed. A rod attached to the engine block extends adjacent to the reservoir. In the event of a frontal collision, the projecting rod breaks off the well, spilling the mercury and thereby cutting off the ignition. In the event that the vehicle is overturned, the mercury drains out of the top of the reservoir. The Gross device, however, also fails to eliminate either the live battery post or the live wiring running from the battery to the switch terminal. Furthermore, it is questionable whether the arrangement would be effective in the event of a rear or side impact.

U.S. Pat. No. 3,410,359, issued Nov. 12, 1968 to Mollison, discloses a device which includes a moving contact mounted on a conducting blade which normally biases the contact against a second contact, which in turn is connected to the battery. The other end of the blade is connected to the wiring harness. In the event of a collision, a spring loaded trigger is released against the blade so that the moving contact is pushed against another contact which is connected to ground, thereby disconnecting the battery from the wiring harness and grounding the harness. As with the previously described devices, the Mollison switch fails to eliminate all live wiring in a wrecked vehicle, inasmuch as both the exposed battery posts and the wiring leading from the battery to the circuit breaking device remain live even after the spring loaded trigger is released. Furthermore, Mollison does not appear to teach a device which will disconnect the electrical circuit in the event of a rollover accident, as opposed to a collision.

U.S. Pat. No. 3,830,331, issued Aug. 20, 1974 to Piazza, describes a device having a "z"-shaped male plug, one end of which is secured to the engine block, and the other end of which forms a prong which is slidably engaged by the sleeve of a female member. The sleeve of the female member extends from a lead cylinder, the opposite end of which is connected to a cable leading to the battery. When impact occurs, the inertia of the heavy lead weight on the female member causes it to move forward and disengage the sleeve from the prong of the male plug. Again, this device fails to completely eliminate the exposed battery posts and the possibility of live wiring in the wrecked vehicle; furthermore, the Piazza device would not appear to disconnect the electrical system in the event of a rollover accident, or a side or rear-end collision.

Accordingly, there exists a need for a device to effectively disconnect the wiring of a vehicle from the battery in the event of a front- or rear-end collision or a rollover accident so as to eliminate all possibility of live wiring in the vehicle, as well as for a device which will prevent live battery terminals or posts from coming into contact with the vehicle structure in such an accident and causing sparks which may ignite a fire.

SUMMARY OF THE INVENTION

The present invention, in its broadest sense, resides in an emergency circuit breaker for preventing the transmission of electrical current to a vehicle from a battery connected in an electric circuit of the vehicle. The battery is connected in the circuit of the vehicle so that at least one terminal is not grounded under normal conditions. The circuit breaker has impact resistant means for shielding the ungrounded terminal of the battery from electrical contact with the structure of the vehicle. Fuse means are provided for interrupting the flow of current from the battery to the vehicle circuit in response to a predetermined increase in the current flowing through the fuse means. Means are provided for connecting the ungrounded terminal of the battery to a first side of the fuse means, and impact resistant means are provided for shielding the electrical connecting means from contact with the structure of the vehicle. Switch means are provided for connecting a second side of the fuse means to ground in response to perturbation of the vehicle by an accident. Accordingly, in the event of an accident, such perturbation causes the switch means to electrically connect the second side of the fuse means to ground, thus increasing the flow of current through the fuse means so that the fuse means interrupts the circuit, and the ungrounded terminal of the battery and the means connecting the ungrounded terminal to the fuse means are shielded from contact with the structure of the vehicle in the event of impact therewith as a result of the accident.

In a first embodiment, the circuit breaker has a conductive receptacle for receiving the ungrounded battery post. A fuse link is provided which has a first end in electrical contact with the receptacle and a second end. The fuse link is adapted to interrupt the flow of current therethrough in response to an increase in the current. Also provided is a conductive cable post which is adapted to have a battery cable of the vehicle electrical circuit attached thereto and which is in electrical contact with the second end of the fuse link. Switch means are provided for connecting the second end of the fuse link to ground in response to perturbation of the vehicle by an accident. An impact resistant insulating housing shields the battery post receptacle, the fuse link, and the switch means from electrical contact with the structure of the vehicle.

The switch means may comprise an impact switch and a rollover switch. The impact switch comprises a cylindrical bore having its axis aligned in a longitudinal direction with respect to the a normal direction of motion of the vehicle. First and second electrical contacts protrude laterally into the bore to form a contact gap intermediate the first and second ends thereof. The first contact is connected to the second end of the fuse link, and the second contact is connected to ground. A first ferrous ball is disposed in the bore intermediate the first end thereof and the contact gap, and is sized to bridge the gap in the event that it moves into contact with the contacts. A second ferrous ball is similarly disposed in the bore intermediate the second end thereof and the contact gap. A first magnetic cup is mounted in the first end of the bore for retaining the first ferrous ball at a spaced distance from the contact gap under normal conditions, and is adapted to release the ball to move into contact with the first and second contacts in the event of an impact imparted to the vehicle in a first longitudinal direction. A second magnetic cup is similarly mounted in the second end of the bore for retaining the second ball apart from the contact gap until the ball is released to move into contact with the first and second contacts in response to an impact in a second longitudinal direction.

The rollover switch comprises a vertically elongated opening in the housing, in which are mounted third and fourth electrical contacts which form a contact gap, the third contact being connected to the second end of the fuse link and the fourth contact being connected to ground. A third ferrous ball is disposed in the vertically elongate opening, and is adapted to close the contact gap in the event that it moves into contact with the third and fourth contacts. A third magnetic cup is mounted in the opening to retain the ball a spaced apart distance in substantially vertical alignment below the contact gap under normal conditions, and is adapted to release the ball to move into contact with the third and fourth contacts in the event that the vehicle is inverted by an accident.

The switch means may also comprise a side impact switch. The side impact switch may comprise a cylindrical bore having its axis aligned in a lateral direction with respect to a normal direction of motion of the vehicle. Similarly to the longitudinal impact switch, the side impact switch is provided with first and second electrical contacts which form a gap across the bore between its first and second ends. The first contact is connected to the second end of the fuse link and the second contact is connected to ground. A first ferrous ball is retained in a magnetic cup at a first end of the bore, and a second ferrous ball is retained in a second magnetic cup at a second end of the bore. Each magnetic cup is adapted to release its ferrous ball to move along the bore and into contact with the first and second contacts in the event of an impact imparted to the vehicle in a selected lateral direction. Each ferrous ball is adapted to close the gap between the contacts in the event when it moves into contact therewith.

In another embodiment, the switch means may comprise a chamber having a bowl-shaped lower portion with a substantially circular upper rim, and a closed upper portion. First and second contact rings are mounted circumferentially about the rim of the chamber, so that a gap is formed between the contact rings, the first contact ring being connected to the second end of the fuse link and the second contact ring being connected to ground. A ferrous ball is disposed in the chamber and is adapted to close the gap between the contact rings in the event that it moves into contact therewith. A magnetic cup is mounted proximate the center of the lower portion of the chamber to retain the ball at a spaced distance from the contact gap under normal conditions, the cup being adapted to release the ferrous ball in response to an impact to, or inversion of, the vehicle by an accident, so that the ball moves into contact with the contact rings. A magnetic belt may be mounted about the rim for subsequently retaining the ferrous ball in contact with the contact rings.

In another embodiment, there is a battery having an integral emergency circuit breaker. The battery comprises an impact resistant insulating case for shielding its contents from electrical contact with the structure of the vehicle in the event of an accident. A charge storage section is enclosed within the case, and has first and second poles. A first terminal is provided which has an end which is exposed at the surface of the case and which is normally connected to ground, the first terminal being connected to the first pole of the charge storage section. A second terminal is provided which has an end which is exposed at the surface of the case, and which is normally ungrounded. A fuse link is enclosed within the case and has a first end which is connected to the second pole of the storage section, and a second end which is connected to the second terminal. The fuse link is adapted to interrupt the flow of current therethrough in response to an increase in the current. There are switch means in electrical contact with the second end of the fuse link, the switch means being enclosed within the case and being adapted to electrically connect the second end of the fuse link to ground in response to perturbation of the vehicle by an accident.

Other features of the present invention will become apparent from the following detailed description.

DESCRIPTION OF THE PREFERRED EMBODIMENTS

Figure 1:
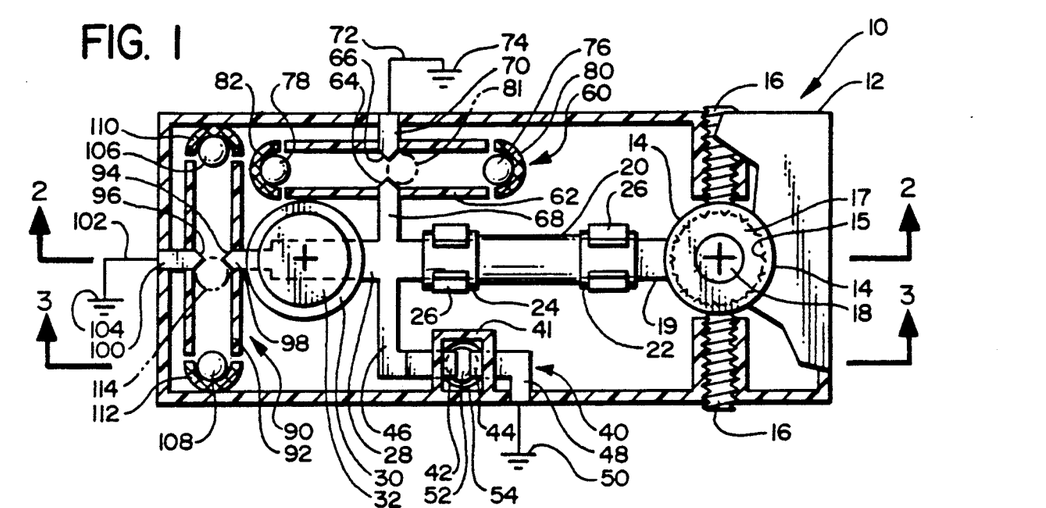
FIG. 1 is a plan view of a circuit breaker incorporating the present invention, with a portion cut away to reveal internal components.

FIG. 1 shows an emergency circuit breaker assembly 10 in accordance with the present invention. Assembly 10 is adapted to be mounted to that terminal of a battery which is not grounded to the structure of the vehicle under normal conditions. As used in this description and the appended claims, the term "structure" of the vehicle refers generally to the bodywork thereof, including the body panels, frame, engine block, etc., which are typically composed of metallic, electrically conductive material, and which are typically interconnected in non-insulating contact with one another. In many vehicles, such as typical automobiles, trucks, buses, motorcycles, and the like, the structure of the vehicle serves as a common ground which forms one side of the circuit.

Thus, one post or terminal of the battery, typically the negative terminal, is grounded to the vehicle structure under normal conditions. The other terminal of the battery, typically the positive terminal, is ungrounded under normal conditions, and is instead connected to the wiring harness which supplies current to a variety of components. Accordingly, it will be understood that the normal current flow from the positive pole of the battery, because it must pass through the wiring harness and the resistance of the components in order to reach the ground side of the circuit, is significantly less than it would be if the positive pole of the battery were to be connected directly to ground through minimum resistance. In other words, if the positive terminal of a typical battery were, in the event of an emergency, to be connected directly to ground, the flow of current from the positive terminal through the means connecting that terminal to ground would be significantly greater than that flowing from the positive terminal to the wiring harness under normal conditions.

It may be noted at this point that the terms "normal conditions", "normal circumstances", or the like, as used in this description and the appended claims, refer both to the normal, relatively undamaged structure, electrical circuit, battery, etc., of the vehicle, as well as to the normal operating modes of the vehicle, in which the forces which are associated with the normal operation of the vehicle (e.g., bouncing, jarring, centripetal forces) act upon the components mounted thereto. By contrast, the term "accident" refers to an event, such as a collision or a rollover, which results in perturbation of the vehicle, and which generally causes damage to the structure of the vehicle and which may cause spillage or leakage of fuel or other flammable materials. Furthermore, the term "perturbation" refers to the action of greatly disturbing the vehicle or other object physically, so as to unsettle, derange, and throw the components thereof into confusion. As noted above, such perturbation may cause fuel leaks, damage wiring harness insulation, toss the battery about the engine compartment so that its ungrounded terminals contact the vehicle structure, and so forth, and thus create a severe fire hazard.

With further reference to FIG. 1, it will be seen that circuit breaker assembly 10 is provided with a housing 12, which serves not only as a support structure for the internal components of assembly 10, but also serves as an impact resistant casing for shielding the ungrounded terminal of the battery and the internal components of circuit breaker assembly 10 from electrical contact with the structure of the vehicle. Accordingly, housing 12 is constructed of a material which exhibits both good insulating qualities and high impact resistance, for example, high impact plastic or hard rubber. Housing 12 preferably completely surrounds and shields the portion of the positive battery post which is exposed at, or which protrudes from, the surface of the case of the battery, as well as the internal components of the circuit breaker assembly.

Within housing 12 there is mounted a battery post receptacle 14 for receiving a typical positive battery post. Receptacle 14 is preferably provided with internal vertical fluting or teeth 15 which cut into and grip the battery post so as to establish good electrical contact between the post and receptacle. While many typical battery posts or terminals protrude outwardly from the battery casing so as to be gripped by a cable clamp, some conventional batteries have relatively flush posts or terminals which are tapped to receive a bolt on a flush-fitting cable connector. Accordingly, it will be understood that receptacle 14 may either be a recessed receptacle for receiving a conventional protruding battery post, as shown in FIG. 1, or a flush fitting receptacle for mounting against a flush mount battery post. Receptacle 14 may be provided with a pair of set screws 16, which are threadably engaged with lateral bores which penetrate into the interior of receptacle 14 so that the set screws can bear directly against the post when it is received in the receptacle, thereby securing circuit breaker assembly 10 to the battery post. Alternatively, as shown in FIG. 1, the set screws 16 may be threadably engaged with bores formed in housing 12 so as to bear against the exterior surface of battery post receptacle 14, so that when they are tightened they force the material of the receptacle against the battery post. Receptacle 14 itself is composed of a suitable conductive material, such as lead or copper.

The upper end of receptacle 14 preferably abuts against a solid plug 17 of insulating material. Plug 17 is preferably formed as part of housing 12, and provides a surface on which a person can tap with a hammer when installing circuit breaker assembly 10, so as to drive battery post receptacle 14 down onto the battery post, with the internal teeth 15 cutting into the surface of the battery post. Plug 17 may be provided with a legend 18, such as a red dot bearing a "+" sign, to indicate the proper terminal of the battery for installation of the circuit breaker assembly.

Electrical connector 19, which may be a separate electrical conductor, such as a wire, or, as is shown in FIG. 1, an extension of the conducting material of receptacle 14, connects receptacle 14 to the first end of fuse link 20. The first and second ends 22, 24 of fuse link 20 are mounted in fuse clips 26. Fuse link 20 permits the flow of current therethrough from its first end to its second end under normal conditions, such as the normal loads associated with the starting and operation of the vehicle. Fuse link 20 is, however, adapted to interrupt the flow of current therethrough in response to a significant, predetermined increase in such flow, as would result if the current were to flow directly from the positive battery terminal through fuse link 20 to ground. Fuse link 20 may be any suitable form of fuse known to those skilled in the art, such as a fuse having metallic wires or strips which melt under excessive current loads, or may be, as another example, a solenoid activated trip-type circuit breaker. Furthermore, it will be understood that, while the fuse link 20 in FIG. 1 is shown connected in circuit breaker assembly 10 so as to carry (and hence directly interrupt) the entire flow of current from the battery to the wiring harness, the circuit breaker may be equally effective in an arrangement wherein the fuse link is connected in a secondary circuit between the positive battery post and switch means (which will be described below), and wherein fuse link 20 serves to activate other circuit-interrupting means in the main circuit leading from the positive battery post to the vehicle wiring harness. In such an alternative arrangement, impact resistance insulating shielding would be provided for the portion of the main circuit which would run between the battery post and circuit-interrupting means.

In the embodiment shown in FIG. 1, the second end 24 of fuse link 20 is connected by electrical connector 28 to cable post 30. As with electrical connector 19 described above, electrical connector 28 may either be a separate electrical connector or an extension of the material of cable post 30. Cable post 30 is preferably formed of a suitable conductive material, such as, for example, lead or copper, and has an outer end 32 which protrudes from housing 12 to provide a suitable attachment point for a conventional battery cable connected to the vehicle's wiring harness.

Connected via connector 28 to the second end of fuse link 20 is a rollover switch 40, which is set in an opening or chamber 41 formed in housing 12. Rollover switch 40 comprises a pair of electrical contacts 42 and 44, which are fabricated of a suitable conductive material, and which are positioned and spaced apart from one another so as to form an electrical contact gap within chamber 42. Contact 42 is connected by connectors 46 and 28 to second end 24 of fuse link 20, and electrical contact 44, in turn, is connected by connector 48 to ground 50, which may be the frame, engine block, or other part of the vehicle structure. Ground 50 may also be, as will be discussed below, the other (i.e., the negative) terminal of the battery. Rollover switch 40 further comprises a closing member 52 which is mounted in chamber 42 so that it is free to move vertically therein. Closing member 52 is adapted to close the gap between contacts 42 and 44 in the event that it comes into contact therewith. Electrical closing member 52 may, for example, be a mass of mercury or a ball of electrically conductive solid metal, such as a ferrous ball having a suitable diameter to bridge the gap between the contacts. As used in this description and the appended claims, the term "ferrous" refers to a material having iron or an iron compound therein, such as steel, so that such material is both electrically conductive and attracted by magnetic forces. It will be understood that other paramagnetic materials are available for use in the present invention which also exhibit conductive qualities, such as nickel, although such materials are typically more expensive than ferrous materials. Closing member 52 rests in a cup 54 under normal conditions. If closing member 52 is a ferrous ball, cup 54 is preferably a magnetic cup having a corresponding concave interior surface. Cup 54 is arranged to retain closing member 52 a vertically, spaced apart distance below the contact gap under normal conditions. However, in the event that the vehicle is inverted by an accident, cup 54 is adapted to release closing member 52 so that the latter moves vertically to come into contact with electrical contacts 42 and 44, thereby completing the connection between the second end of fuse link 20 and ground 50. If closing member 52 is a mass of mercury, it will simply flow under the influence of gravity into contact with contacts 42 and 44 if the vehicle is inverted; if closing member 52 is a ferrous ball and cup 54 is a magnetic cup, then the mass of ferrous ball 52 and the magnetic force of cup 54 are selected so that the ball will be released from the cup and fall vertically into contact with contacts 42 and 44. The resulting increase in current flowing through fuse link 20 will, in turn, cause the fuse link to "blow", thereby immediately interrupting the flow of current from the battery to the wiring harness, and eliminating the possibility of live wiring in the vehicle which might cause sparking. Furthermore, impact resistant insulating housing 12 will prevent the positive battery post from coming into contact with the vehicle structure (e.g., the interior of the engine compartment) in the event that the battery is dislodged and falls due to the inversion of the vehicle.

Circuit breaker assembly 10 also includes a longitudinal impact switch 60, which is positioned in housing 12 laterally opposite rollover switch 40, thus providing a compact and sturdy arrangement. Longitudinal impact switch 60 comprises a substantially cylindrical bore 62 in the insulating material of housing 12, the longitudinal axis of which is adapted to be aligned with the normal direction of motion of the vehicle when the circuit breaker assembly is mounted on the battery. First and second electrical contacts 64 and 66 penetrate bore 62 laterally to form a contact gap at a point intermediate the first and second ends of bore 62. First contact 64 is connected by connectors 68 and 28 to the second end 24 of fuse link 20, and electrical contact 66 is connected by connector 72 to ground 74. Ground 74 may be, as previously described, the structure of the vehicle or the other pole of the battery. A first circuit closing member, which is preferably a suitably sized ferrous ball 76 similar to that described above, is disposed in bore 62, intermediate a first end of the bore and the contact gap, so that the ball is free to move longitudinally therethrough. A second ferrous ball 78 is similarly disposed in bore 62 intermediate the second end thereof and the contact gap. First and second ferrous balls 76 and 78 are each adapted to close the gap between contacts 64 and 66 in the event that they move into contact therewith, so as to thereby complete the electrical connection between the second end of fuse link 20 and ground 74.

A magnetic holding cup 80 is mounted in the first end of bore 62, and has an inner face which receives first ferrous ball 76. The mass of ferrous ball 76 and the magnetic force of cup 80 are selected such that an impact of predetermined magnitude imparted to the vehicle in the applicable longitudinal direction will cause first ferrous ball 76 to separate from magnetic cup 80 due to the inertia of ball 76. Following separation, the inertia of ferrous ball 76 will carry it through bore 62 until it comes into contact with contacts 64 and 66, in the position indicated by broken line image 81. The electrical connection between the second end of fuse link 20 and ground 74 is thus completed, and the resulting increase in current flowing through fuse link 20 causes it to interrupt the circuit in the manner previously described. Second ferrous ball 78 is similarly retained in the second end of bore 62 by second magnetic cup 82.

Figure 2:
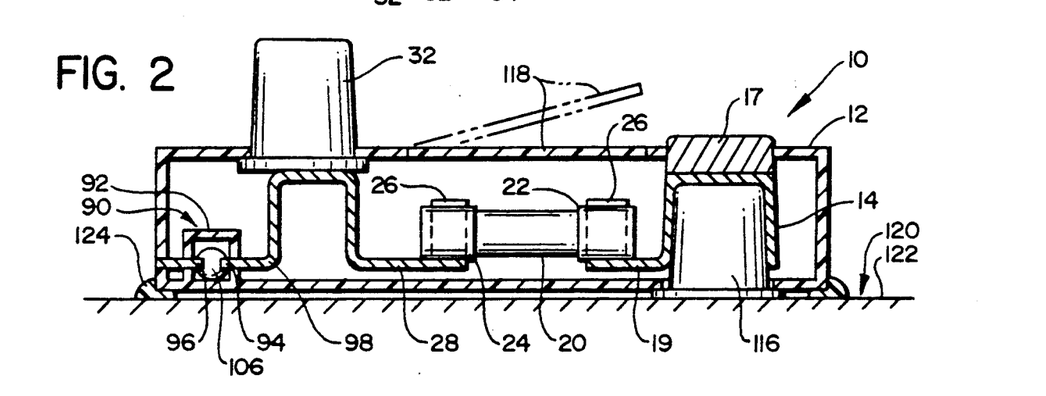
FIG. 2 is a side sectional view of the circuit breaker of FIG. 1 taken along line 2—2.

If, for illustrative purposes, it is assumed that the normal direction of forward motion of the vehicle is to the left in FIG. 2, it will be seen that first ferrous ball 76 and first magnetic cup 80 will be responsive to opposing impacts received at the forward end of the vehicle, which would result in ferrous ball 76 moving to the left through bore 62, while second ferrous ball 78 and second magnetic cup 82 will be responsive to opposing impacts at the rear end of the vehicle. Inasmuch as rear-end impacts are typically less severe than front end impacts, it may be desirable, in this example, to either increase the mass of second ball 78 or decrease the magnetic force of second cup 82 (relative to the first ball and cup, which need to resist separation when subjected to normal braking forces), so as to make it relatively easier for second ferrous ball 78 to separate from cup 82.

FIG. 1 also shows a lateral impact switch 90, which is similar in construction and operation to longitudinal impact switch 60, with the exception that the lateral impact switch is oriented with its axis substantially perpendicular to the normal direction of motion of the vehicle. Accordingly, lateral impact switch 90 comprises a substantially cylindrical bore 92 in the insulating material of housing 12, into which first and second electrical contacts 94 and 96 penetrate laterally to form a contact gap between them at a point intermediate the first and second ends of the bore. First contact 94 is connected by electrical connectors 98 and 28 to second end 24 of fuse link 20, while contact 96 is connected by connectors 100 and 102 to ground 104.

A first ferrous ball 106 is disposed in bore 92 intermediate the first end of the bore and the contact gap so that it is free to move longitudinally through the bore. Similarly, second ferrous ball 108 is disposed in bore 92 intermediate the second end of the bore and the contact gap. First and second ferrous balls 106 and 108 are each adapted to close the contact gap in the event that they move into contact therewith, thereby completing an electrical connection between the second end of the fuse link and ground. A first magnetic holding cup 110 is mounted in the first end of bore 92 and has a concave inner face which receives ferrous ball 106. Similarly, a second magnetic cup 112 is mounted in the second end of bore 92 and retains a second ferrous ball 108. The mass of each ball 106 and the magnetic force of its associated holding cup are selected so that an impact of a predetermined magnitude which is imparted to the vehicle in the applicable lateral direction will result in the separation of the ball from the cup. Following separation, the inertia of the ball 106 will carry it through bore 92 until it comes into contact with contacts 94 and 96, as in the position indicated by broken line image 114, thus completing the connection between the second end of fuse link 20 and ground 104, and causing fuse link 20 to interrupt the circuit in the manner previously described.

It will be understood by those skilled in the art that other forms of switches which are responsive to impact and/or inversion, such as other forms of inertia-sensing switches, may be substituted for the above-described embodiments of the rollover switch, longitudinal impact switch, and lateral impact switch in the circuit breaker assembly of the present invention.

FIG. 2 shows a side view of circuit breaker assembly 10, in which battery post receptacle 14 is seen secured to a positive battery post 116 which protrudes above casing 122 of battery 120. Housing 12 fits closely against casing 122, and a bead 124 of sealant is provided at the outer joint where these meet, providing a weatherproof seal which prevents corrosion of battery post 116 and the internal components of circuit breaker assembly 10. Fuse link 20 shown in FIGS. 1–2 is a replaceable fuse, such as a conventional cartridge-type or automotive-type fuse, and, accordingly, a door 118 is provided in housing 12 to permit access for the removal and replacement of the fuse link. Fuse clips 26 permit easy engagement and disengagement of fuse link 20, and provide effective electrical contact with the ends thereof.

Figure 3:
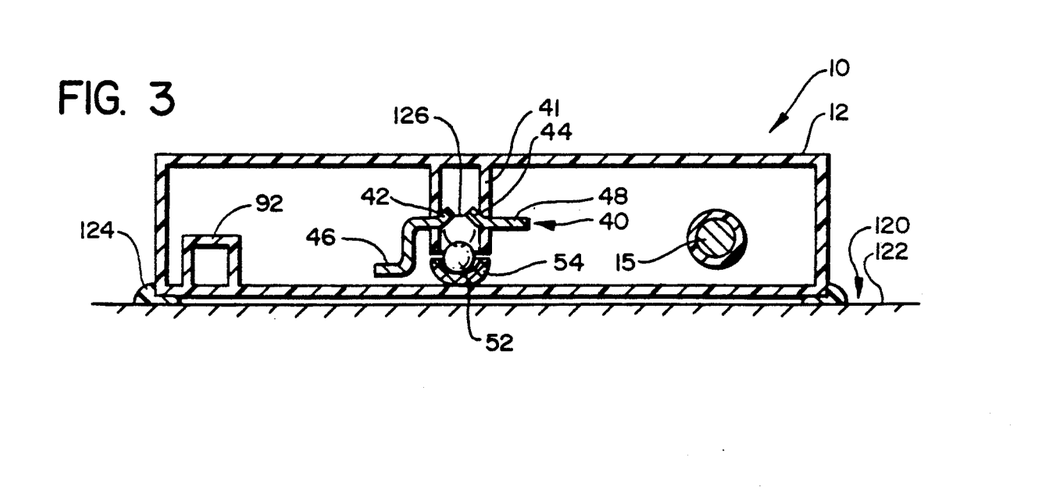
FIG. 3 is a side sectional view of the circuit breaker of FIG. 1 taken along line 3—3.

FIG. 3 shows the vertically extending chamber 41 of the roll-over switch which is formed within housing 12. Ferrous ball 52 is mounted for vertical movement within chamber 41, and is retained by magnetic cup 54 a spaced distance below the gap between contacts 42 and 44 under normal conditions. Upon inversion of the vehicle by an accident, however, cup 54 releases ball 52, which moves vertically into contact with contacts 42 and 44 in the position indicated by broken line image 126, closing the gap between the contacts and thereby causing the fuse link to interrupt the flow of current to the vehicle's wiring harness.

Figure 4:
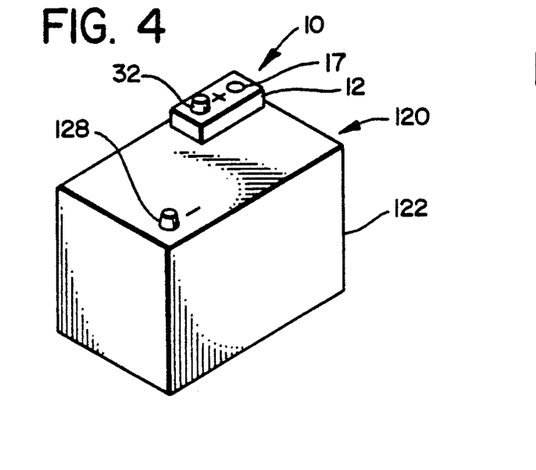
FIG. 4 is a perspective view of a conventional vehicle battery having the circuit breaker of FIG. 1 mounted thereon.

FIG. 4 shows a perspective view of the circuit breaker assembly 10 of FIGS. 1-3 mounted on conventional battery 120. Negative battery post 128 protrudes from the insulating case 122 of the battery, and is typically connected to ground by a grounding strap running to the engine block or other part of the vehicle structure. It will be observed that the protruding portion of the positive battery post is completely surrounded by impact resistant insulating housing 12. The cable post end 32, which in turn protrudes from housing 12 of circuit breaker assembly 10, provides a suitable attachment point for the battery cable leading to the vehicle's wiring harness, which cable would in a conventional installation be attached directly to the positive post of the battery.

Figure 5A:
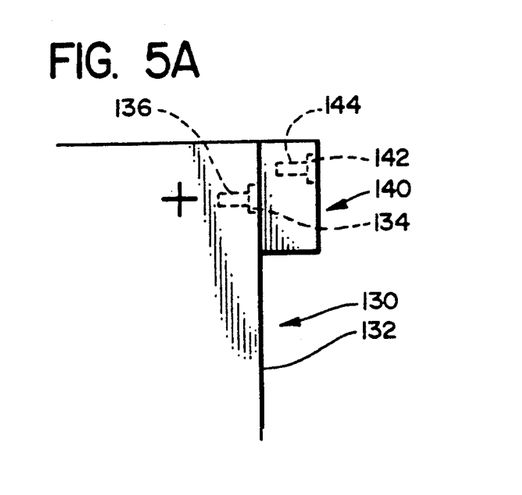
FIG. 5A is a diagrammatical representation of another embodiment of circuit breaker incorporating the present invention, this being mounted on a conventional vehicle battery having flush-type side post terminals.
Figures 5B, 6:
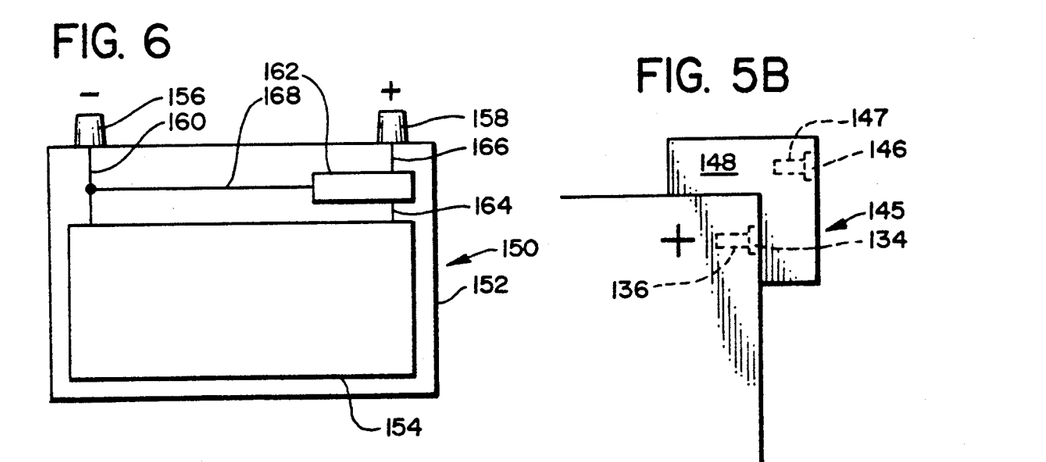
FIG. 5B is another diagrammatical representation of the side post battery of FIG. 4A, having another embodiment of circuit breaker incorporating the present invention mounted thereon.
FIG. 6 is a diagrammatical representation of a battery having an integral circuit breaker switch in accordance with the present invention.

FIG. 5A shows a diagrammatical view of another embodiment of circuit breaker in accordance with the present invention, this being mounted on conventional sidepost-type battery 130 having a case 132 and a substantially flush positive post or terminal 134. Flush terminal 134 is provided with a tapped central bore 136 which, when connected in a conventional manner, receives the central bolt of a flush fitting battery cable connector. In this embodiment of the invention, circuit breaker assembly 140 is mounted to the side of battery 130 so as to enclose terminal 134. Assembly 140 has a battery post receptacle which, rather than receiving a protruding battery post as described above, has a face (not shown) which fits flushly against side terminal 134. A central bolt (not shown) passes through the flush fitting face of the battery post receptacle and threads into tapped bore 136, so as to secure circuit breaker assembly 140 against the side of battery 130. Circuit breaker assembly 140 is likewise provided with a flush mount type cable post or terminal 142, which corresponds to cable post 32 described above, and which is penetrated by a tapped central bore 144 for attachment of the flush mounting battery cable. Apart from the just-described features relating to the attachment of the assembly to the side terminal-type battery, circuit breaker assembly 140 is substantially similar in construction and operation to that described above with reference to FIGS. 1-3. FIG. 5B shows a diagrammatical view of a circuit breaker 145 which is very similar to that shown in FIG. 5A, and which also mounts to the side post-type battery 130. Circuit breaker assembly 145 mounts to the side post terminal 134 in the manner described above, and accordingly has a substantially flush cable post 146 having a tapped central bore 147. Circuit breaker assembly 145 differs from that shown in FIG. 5A in that assembly 145 is provided with a horizontally elongate housing portion 148 which serves to provide additional space in which to enclose longitudinal and/or lateral impact switches, such as those described above.

The foregoing discussion has focused on circuit breaker assemblies which are suitable for mounting on the exterior of conventional vehicle batteries; this provides a suitable assembly which can be purchased separately from the conventional battery and installed by safety conscious vehicle owners, dealers, or manufacturers. Desirably, however, a newly manufactured battery may be provided which incorporates such a circuit breaker as an integral part thereof. Accordingly, FIG. 6 shows a block diagram of a battery 150 having an impact resistant insulating case 152 for shielding its contents from electrical contact with the structure of the vehicle in the event of perturbation of the vehicle by an accident. Battery 150 has a conventional charge storage section 154 which is enclosed within insulating case 152, and which has a first pole and a second pole. The first pole may be the negative pole and the second pole may be the positive pole. Battery 150 has an exposed negative terminal 156, which may be a protruding battery post, as shown, or a flush-mount side terminal as previously described, and which is connected by electrical connector 160 to the negative pole of charge storage section 154. Similarly, an exposed positive terminal 158 is also provided. Negative terminal 156 is normally grounded to the structure of the vehicle and positive terminal 158 is normally connected to the wiring harness.

A circuit breaker assembly 162, such as that described above, is enclosed within case 152. As was previously described assembly 164 is provided with a fuse link and switch means (not shown in FIG. 6). The first end of the fuse link is connected to the positive pole of the charge storage section by connector 164, and the second end of the fuse link is connected to positive battery terminal 158 by connector 166. The switch means, which may be the combination of rollover and longitudinal and lateral impact switches, previously described, or may be the circular switch assembly which will be described below, is enclosed within battery case 152, and is also connected to the second end of the fuse link. The switch means is adapted to connect the second end of the fuse link to ground in response to perturbation of the vehicle by an accident and in the arrangement shown, the switch means is configured to connect the second end of the fuse link to the ground provided by the other (negative) terminal of the battery or the negative pole of the charge storage section. Accordingly, connector 168, such as a wire, is enclosed within the case of the battery and connects the switch to negative terminal 156 and the negative pole of charge storage section 154. In the event of perturbation of the vehicle by an accident, the resulting very large flow of current from the positive pole of the battery to the negative pole of the battery through the fuse link causes the fuse link to interrupt the circuit from the positive pole of the storage section to the exposed positive terminal of the battery.

In an arrangement similar to the previously-described access door 118, an access door may be provided in battery case 152 for removal and replacement of the fuse link in circuit breaker assembly 162.

Figure 7:
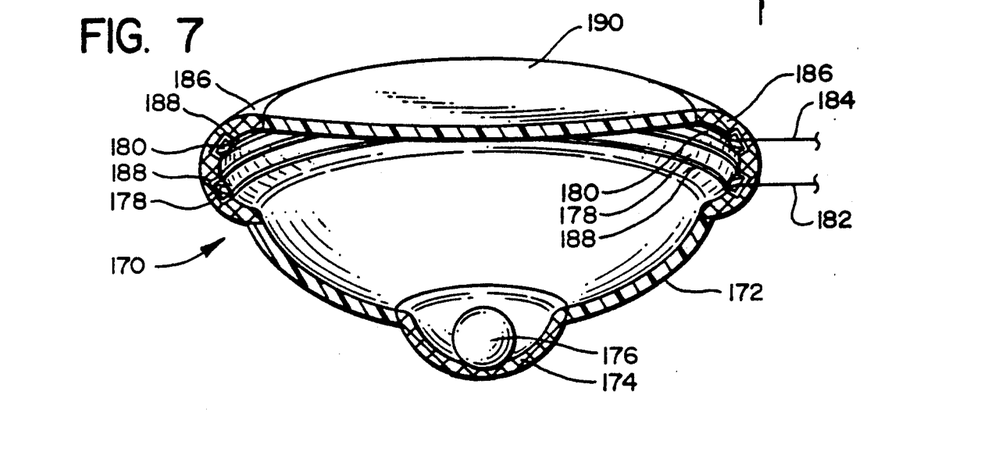
FIG. 7 is a sectional view of another embodiment of a switch for use in a circuit breaker in accordance with the present invention.

FIG. 7 shows another embodiment of switch means for use in the circuit breaker of the present invention and, in particular, shows a circular switch assembly 170 which is responsive to impacts imparted to the vehicle in any generally horizontal direction, as well as to rollover of the vehicle. Switch assembly 170 is preferably hemispherical in overall shape, and has a bowl-shaped lower portion, or bowl 172. While a bowl-shaped lower portion may be preferable for helping retain the closing member of the switch in the desired position during normal operation of the vehicle, it will be understood that in some applications the lower portion of switch assembly 170 may not necessarily be bowl shaped; for example, a generally flat, circular lower portion may be desirable in some applications. Proximate the center of bowl 172 is mounted magnetic cup 174. Magnetic cup 174, in a manner similar to the magnetic cups previously described, has an interior surface which is concave for receiving and retaining a ferrous ball 176 closing member under normal conditions. The mass of ball 176 and the magnetic force of cup 174 are such, however, that ferrous ball 176 will be freed to move about the interior of switch assembly 170 in the event that the vehicle suffers an impact or rollover due to an accident.

Bowl 172 has a circular upper edge, about which are circumferentially mounted first and second electrical contact rings 178 and 180. First and second contact rings 178 and 180 are exposed at the interior surface of assembly 170, and are spaced apart from one another to form a contact gap. Ferrous ball 176 is sized to bridge the gap between the first and second contact rings, and is maintained at a spaced apart distance from the contact gap under normal conditions by magnetic cup 174. First contact ring 178 is connected to first connector 182, and second contact ring 180 is connected to second connector 184. In the previously-described manner, one of the connectors 182 or 184 is electrically connected to the second side of the fuse link of the circuit breaker, while the other connector is connected to ground. Accordingly, in the event that ferrous ball 176 is dislodged by an accident and comes into contact with contact rings 178 and 180, an electrical circuit between the second end of the fuse link and ground will be completed, thus causing the fuse link to blow.

Contact rings 178 and 180 may preferably be mounted to the inner surface of a magnetic belt 186. Magnetic belt 186 preferably has a concave inner surface which is configured to receive ferrous ball 176 when it comes into contact with rings 178 and 180, so that ferrous ball 176 is retained in that position to keep the circuit closed. Inasmuch as magnetic belt 186 may be fabricated from an electrically conductive magnetic material, contact rings 178 and 180 are each preferably mounted to magnetic belt 186 in an insulating channel 188, which may be constructed of any suitable insulating material, so as to avoid electrical contact between the contact rings and the magnetic belt.

The upper portion of switch assembly 170 is closed by a cap 190 to prevent the escape of ball 176 from the interior of switch assembly 170 so that, once separated from magnetic cup 174 by an accident, the ball is retained within assembly 170 so that it comes into contact with the contact rings. Cap 190 may preferably be provided with a convex inner surface, so that if ferrous ball 176 is dislodged from magnetic cup 174 by an inversion of the vehicle and falls into contact with cap 190, it will roll off of inner surface of cap 190 toward the circumference thereof, and thus be directed into contact with contact rings 178 and 180. Furthermore, cap 190 may preferably be detachable to provide access to the interior of circular switch assembly 170, so that ferrous ball 176 can be manually removed contact rings and replaced in magnetic cap 174 to reset switch assembly 170 following an accident.

It will be understood from the foregoing description that the circular switch assembly 170 is responsive to impacts imparted in any generally horizontal direction by an accident, as well as to a rollover of the vehicle. Accordingly, in some embodiments of the present invention, the circular switch assembly 170 may be installed in a circuit breaker assembly in place of the separate longitudinal impact, lateral impact, and rollover switches previously described. Furthermore, other suitable inertia-sensing switch mechanisms may be similarly used in a circuit breaker of the present invention.

It is to be recognized that these and various other modifications could be made to the illustrative embodiments without departing from the spirit and scope of the present invention. Accordingly, the invention is not to be limited except as by the appended claims.

What is claimed and desired to be secured by Letters Patent of the United States is:

1. An emergency circuit breaker for preventing the transmission of electrical current to a vehicle from a battery connected in an electrical circuit of said vehicle, said battery being connected in said circuit so that at least one terminal of said battery is not grounded to the structure of said vehicle under normal conditions, said circuit breaker comprising:
    impact resistant means for shielding said ungrounded terminal of said battery from electrical contact with said structure of said vehicle;
    fuse means for interrupting a flow of electrical current from said battery to said circuit in response to an increase in electrical current flowing through said fuse means from a first side of said fuse means to a second side of said fuse means;
    means for electrically connecting said ungrounded terminal of said battery to said first side of said fuse means;
    impact resistant means for shielding said electrical connecting means from electrical contact with said structure of said vehicle; and
    switch means for electrically connecting said second side of said fuse means to ground in response to perturbation of said vehicle by an accident; whereby in response to said perturbation by an accident said switch means electrically connects said second side of said fuse means to ground so as to increase said flow of current through said fuse means, and said fuse means interrupts said flow of current from said battery to said circuit in response to said increased flow of current through said fuse means.

2. The circuit breaker of claim 1, wherein said electrical circuit of said vehicle is electrically connected to said second side of said fuse means.

3. The circuit breaker of claim 2, wherein said switch means comprises:
    a first switch for connecting said second side of said fuse means to ground in response to an impact received in a generally longitudinal direction by said vehicle;
    a second switch for connecting said second side of said fuse means to ground in response to an impact received in a generally lateral direction by said vehicle; and
    a third switch for connecting said second side of said fuse means to ground in response to inversion of said vehicle.

4. An emergency circuit breaker for preventing the transmission of electrical current to a vehicle from a battery connected in an electrical circuit of said vehicle, said battery having at least one post which is not grounded to the structure of said vehicle under normal conditions, said circuit breaker comprising:
    an electrically conductive receptacle for receiving said ungrounded battery post in electrical contact therewith;
    a fuse link for interrupting a flow of current therethrough in response to an increase in said flow of current, said fuse link having a first end in electrical contact with said battery post receptacle and a second end;
    an electrically conductive cable post for attachment to a battery cable of said vehicle electrical circuit, said cable post being in electrical contact with said second end of said fuse link;
    switch means for electrically connecting said second end of said fuse link with ground in response to perturbation of said vehicle by an accident; and
    an impact-resistant insulating housing for shielding said battery post receptacle, said fuse link, and said switch means from electrical contact with said structure of said vehicle in the event of perturbation of said vehicle by an accident.

5. The circuit breaker of claim 4, wherein said switch means comprises:
    a portion of said insulating housing having a substantially horizontal cylindrical bore therein, said cylindrical bore having its axis aligned in a longitudinal direction with respect to a normal direction of motion of said vehicle when said circuit breaker is mounted on said battery;
    first and second electrical contacts protruding into said bore a sufficient distance so as to form a gap between said contacts within said bore, said first contact being electrically connected to said second end of said fuse link and said second contact being electrically connected to ground;

at least one paramagnetic closing member disposed in said bore so that said closing member is free to move longitudinally in said bore, said closing member being configured so that said closing member electrically closes said gap in the event that said closing member moves through said bore and into contact with said first and second contacts; and at least one magnet means mounted in said bore for retaining said paramagnetic closing member at a spaced distance from said gap under normal conditions, and for releasing said closing member to move along said bore into contact with said first and second contacts in response to an impact imparted to said vehicle in a selected longitudinal direction.

6. The circuit breaker of claim 5, wherein said paramagnetic closing member is a ferrous ball, and wherein said magnet means is a magnetic cup having a concave inner surface adapted to receive said ferrous ball.

7. The circuit breaker of claim 6, wherein said switch means further comprises:
- a portion of said insulating housing having a vertically elongate chamber therein;
- first and second electrical contacts mounted in said vertically elongate chamber so as to form a gap between said first and second contacts in said chamber, said first contact in said chamber being electrically connected to said second end of said fuse link and said second contact in said chamber being electrically connected to ground;
- a ferrous ball disposed in said vertically elongate chamber so that said ferrous ball in said chamber is free to move vertically therein, said ferrous ball in said chamber further being configured so that said ferrous ball in said chamber electrically closes said gap between said first and second contacts in said chamber in the event that said ferrous ball in said chamber moves into contact therewith; and
- a magnetic cup mounted in said chamber for retaining said ferrous ball in said chamber a spaced distance in substantially vertical alignment below said contact gap in said chamber under normal conditions, and for releasing said ferrous ball in said chamber to move vertically into contact with said first and second contacts in said chamber in response to inversion of said vehicle by an accident.

8. The circuit breaker of claim 7, wherein said switch means further comprises:
- a portion of said insulating housing having a substantially horizontal cylindrical bore therein, said cylindrical bore having first and second ends and having its axis aligned in a lateral direction with respect to a normal direction of motion of said vehicle when said circuit breaker is mounted on said battery;
- first and second electrical contacts mounted in said lateral bore so as to form an electrical gap across said lateral bore at a location intermediate said first and second ends of said lateral bore, said first contact in said lateral bore being electrically connected to said second end of said fuse link and said second contact in said lateral bore being electrically connected to ground;
- a first ferrous ball disposed in said lateral bore intermediate said first end of said lateral bore and said gap across said lateral bore so that said first ferrous ball in said lateral bore is free to move axially therein, said first ferrous ball in said lateral bore being configured so that said first ferrous ball electrically closes said contact gap across said lateral bore in the event that said first ferrous ball in said lateral bore moves into contact with said first and second contacts in said lateral bore;
- a second ferrous ball disposed in said lateral bore intermediate said second end of said lateral bore and said gap across said lateral bore so that said second ferrous ball in said lateral bore is free to move axially therein, said second ferrous ball in said lateral bore being configured so that said second ferrous ball electrically closes said electrical gap across said lateral bore in the event that said second ferrous ball in said lateral bore moves into contact with said first and second contacts in said lateral bore;
- a first magnetic cup mounted in said first end of said lateral bore for retaining said first ferrous ball in said lateral bore at a spaced distance from said contact gap in said lateral bore under normal conditions, and for releasing said first ferrous ball in said lateral bore to move into contact with said first and second contacts in said lateral bore in response to an impact imparted to said vehicle in a first lateral direction by an accident; and
- a second magnetic cup mounted in said second end of said lateral bore for retaining said second ferrous ball in said lateral bore at a spaced distance from said contact gap in said lateral bore under normal conditions, and for releasing said second ferrous ball in said lateral bore to move into contact with said first and second contacts in said lateral bore in response to an impact imparted to said vehicle in a second lateral direction by an accident.

9. The circuit breaker of claim 4, wherein said switch means comprises:
- a chamber having a lower portion with a substantially circular rim about an edge thereof and a substantially closed upper portion;
- first and second electrical contact rings mounted substantially circumferentially about said circular rim of said chamber so as to form an electrical gap between said first and second contact rings, said first contact ring being electrically connected to said second end of said fuse link and said second contact ring being electrically connected to ground;
- a ferrous ball disposed in said chamber so that said ferrous ball is free to move about said chamber, said ferrous ball being configured so that said ferrous ball electrically closes said electrical gap in the event that said ferrous ball moves into contact with said first and second contact rings; and
- a magnetic cup mounted to said chamber proximate the center of said lower portion for retaining said ferrous ball at a spaced distance from said gap under normal conditions, and for releasing said ferrous ball to move through said chamber and into contact with said first and second contact rings in response to said perturbation of said vehicle by an accident.

10. The circuit breaker of claim 9, wherein said chamber is a substantially hemispherical chamber having a bowl-shaped lower portion, and said first and second contact rings are mounted circumferentially about an upper edge of said bowl-shaped lower portion.

11. The circuit breaker of claim 10, further comprising a magnetic belt mounted circumferentially about said upper edge of said bowl-shaped portion for retaining said ferrous ball in said contact with said first and second electrical contact rings, said magnetic belt having an inner surface with said first and second electrical contact rings mounted thereto.

12. The circuit breaker of claim 4, wherein said impact-resistant insulating housing is a high-impact plastic housing.

13. The circuit breaker of claim 4, wherein said fuse link is a replaceable fuse link, and wherein said impact-resistant insulating housing further comprises an access door for permitting removal and replacement of said fuse link in said housing.

14. An emergency circuit breaker for preventing the transmission of electrical current to a vehicle from a battery having a charge storage section and first and second poles, said battery being connected in an electrical circuit of said vehicle so that under normal conditions said second pole of said battery is grounded to the structure of said vehicle and said first pole of said battery is not grounded to said structure of said vehicle, said circuit breaker comprising:

fuse means for interrupting a flow of electrical current from said battery to said circuit in response to an increase in electrical current flowing through said fuse means from a first side of said fuse means to a second side of said fuse means;

means for electrically connecting said first pole of said battery to said first side of said fuse means;

switch means for electrically connecting said second side of said fuse means to ground in response to perturbation of said vehicle by an accident; and impact resistant means for shielding said first pole of said battery and said means for electrically connecting first pole of said battery to said fuse means from electrical contact with said structure of said vehicle;

whereby in response to said perturbation of said vehicle by an accident said switch means electrically connects said second side of said fuse means to ground so as to increase said flow of current through said fuse means, and said fuse means interrupts said flow of current from said battery to said circuit in response to said increased flow of current through said fuse means.

15. The circuit breaker of claim 14, further comprising means for electrically connecting said second side of said fuse means to said electrical circuit of said vehicle.

16. The emergency circuit breaker of claim 15, wherein said first pole of said battery is a first battery post having an end exposed at the surface of a battery case containing said charge storage section of said battery, and wherein said means for electrically connecting said first pole of said battery to said first side of said fuse means is an electrically conductive receptacle for receiving said first battery post.

17. The emergency circuit breaker of claim 16, wherein said impact resistant shielding means comprises an insulating housing which substantially surrounds said electrically conductive receptacle and said first battery post when said first battery post is received in said receptacle.

18. The emergency circuit breaker of claim 17, wherein said means for electrically connecting said second side of said fuse means to said electrical circuit of said vehicle comprises an electrically conductive cable post, said cable post having an end exposed at the surface of said housing for attachment to a battery cable of said vehicle.

* * * * *